US008655986B2

(12) United States Patent
Fox et al.

(10) Patent No.: US 8,655,986 B2
(45) Date of Patent: Feb. 18, 2014

(54) DATA PATH PROCESSING

(75) Inventors: Michael Fox, San Diego, CA (US);
Faisal Mushtaq, San Jose, CA (US);
Karl Gierach, Irvine, CA (US)

(73) Assignee: Allot Communications Ltd.,
Hod-Hasharon (IL)

( * ) Notice: Subject to any disclaimer, the term of this patent is extended or adjusted under 35 U.S.C. 154(b) by 100 days.

(21) Appl. No.: 13/466,023

(22) Filed: May 7, 2012

(65) Prior Publication Data

US 2012/0284373 A1 Nov. 8, 2012

Related U.S. Application Data

(60) Provisional application No. 61/483,492, filed on May 6, 2011.

(51) Int. Cl.
*G06F 15/16* (2006.01)
*G06F 15/173* (2006.01)

(52) U.S. Cl.
USPC ........... 709/219; 709/217; 709/226; 709/228; 709/229

(58) Field of Classification Search
USPC ......... 709/203, 204, 217, 218, 219, 226, 228, 709/229
See application file for complete search history.

(56) References Cited

U.S. PATENT DOCUMENTS

| | | | |
|---|---|---|---|
| 8,051,195 B1 * | 11/2011 | Kandekar et al. | 709/231 |
| 8,385,916 B2 * | 2/2013 | Raleigh | 709/226 |
| 8,504,713 B2 * | 8/2013 | Arya et al. | 709/232 |
| 8,516,552 B2 * | 8/2013 | Raleigh | 709/217 |
| 2010/0188990 A1 * | 7/2010 | Raleigh | 709/224 |
| 2010/0191575 A1 * | 7/2010 | Raleigh | 709/224 |
| 2010/0191604 A1 * | 7/2010 | Raleigh | 709/228 |
| 2012/0101952 A1 * | 4/2012 | Raleigh et al. | 709/223 |
| 2012/0284373 A1 * | 11/2012 | Fox et al. | 709/219 |

* cited by examiner

*Primary Examiner* — Quang N Nguyen
(74) *Attorney, Agent, or Firm* — Eitan, Mehulal & Sadot

(57) ABSTRACT

An intermediate device receives a content data message addressed to a receiving device for a communication session between a source device and the receiving device. The intermediate device substitutes adapted content data for content data of the content data message and then sends the adapted content data to the receiving device such that it appears to the receiving device that the adapted content data originated from the source device. The communication from the source device to the receiving device is intercepted by the intermediate device in a manner that is transparent to the source device and receiving device.

6 Claims, 11 Drawing Sheets

DATA PATH PROCESSING

CROSS-REFERENCE TO RELATED APPLICATIONS

This application claims the benefit of priority of co-pending U.S. Provisional Patent Application Ser. No. 61/483,492 entitled "Data Path Processing" to Michael Fox, Karl Gierach, Faisal Mushtaq filed May 6, 2011. Priority of the filing date of May 6, 2011 is hereby claimed, and the disclosure of the Provisional Patent Application is hereby incorporated by reference.

BACKGROUND

1. Field of the Invention

The present invention relates to data communications and, more particularly, to managing download of data for multimedia, video, and/or audio streams.

2. Description of the Related Art

Video streaming has become more and more popular. In video streaming, a client machine (such as a desktop or laptop computer or a Web-enabled mobile phone) receives a video stream from a video source over a network connection. The video stream generally includes video format data comprising graphic or image data as well as audio data. The video stream may comprise a video clip having content of a predetermined length, such as a movie or presentation, or the video stream may comprise an ongoing video feed of undetermined length, such as output from a Web cam or some other live signal feed. Several communication protocols have been developed and are standardized to enable streaming video transfer between video source and client machine, for example, protocols such as RTSP, RTMP, HTTP progressive download, MMS, and custom protocols. An example of a download session using HTTP progressive download utilizing the Transmission Control Protocol is described herein as an example download session, but the methods described herein can be utilized with any of the protocols listed above.

In progressive download, reproduction or playback of the video data stream begins after an initial file download using the HTTP protocol from the client end. The initial file can include a portion of the video stream or all of the video stream. When the initial file is a portion of the video stream, it is followed by download of subsequent files corresponding to subsequent portions of the video stream. The files are generally referred to as chunks of the video stream. As the chunks are downloaded, the video playback is started after receiving a few seconds of video data from the video stream without waiting until the entire video stream has been received. The subsequent files comprising the remaining video are downloaded, decoded, and rendered for playback. There has been tremendous demand for video viewing on the Internet and that viewing demand has in turn increased demands on wireless network resources due to ubiquitous coverage and mobile users consuming video seemingly everywhere service is available. Unfortunately, the popularity of video streaming sometimes causes overloading of some bandwidth-limited networks, especially radio frequency (RF) wireless networks such as, for example, cellular telephone networks, WiFi networks, satellite networks, and the like.

The underlying network protocol used for most video is usually TCP or UDP over IP networks. In recent years, the network transfer protocol used for delivery of Internet traffic over all types of networks, including RF wireless networks, is the Transmission Control Protocol (TCP), which is used in conjunction with the Internet Protocol (IP) and is often jointly referred to as TCP/IP. TCP provides reliable, ordered, error-free delivery of a stream of bytes from a program on one computer to a program on another computer. The bytes being transferred are typically organized into packets that are routed over the network using the IP protocol. The TCP protocol has mechanisms for packet flow control, retransmission in case of packet loss, segment size, amount of data in pipeline, network congestion avoidance, and session control, e.g., establishment and termination of a communication session.

Due to factors such as network congestion, traffic load balancing, switch memory overflow, physical link layer loss, or other unpredictable network behavior, IP packets can be lost, duplicated, or delivered out of order at the receiving client. These add to processing operations at the client and can result in choppy video on playback. TCP detects data packet loss and/or delay problems, requests retransmission of lost packets, and rearranges out-of-order packets. TCP also tries to reduce network congestion, to reduce the occurrence of the other problems mentioned above, by packet flow control. Packets comprise collections of bytes of data. For TCP/IP, and indeed for each type of network technology, there is a maximum transmission unit (MTU) that determines the greatest number of bytes (or packets) in a data unit for processing, such as a frame of video data. Once the client machine TCP receiver, which is part of the machine's operating system kernel, has finally reassembled a perfect copy of the data packets originally transmitted into a datagram, it passes that datagram to the application program of the client machine for playback.

TCP is optimized for accurate delivery rather than for timely delivery, and therefore, TCP processing sometimes incurs relatively long delays (on the order of seconds) while waiting for out-of-order messages or retransmissions of lost messages. For viewing video streams, delays in the reception of packets could underflow the video player at the client, resulting in stalled or choppy playback.

Wireless network links are known to experience sporadic and usually temporary losses due to communication artifacts such as fading, shadowing, hand-off, and other radio effects. These effects cannot be considered as being due to network congestion, but nevertheless, TCP may react to such losses with network back-off operations designed to combat congestion. For example, TCP maintains a congestion window, which is the number of unacknowledged packets that are in transit between a sender and receiver. Back-off operations may involve a decrease in the size of the congestion window. After the (erroneous) back-off of the congestion window size, TCP can enter a congestion avoidance phase with a conservative decrease in window size.

This congestion avoidance phase can cause the wireless radio link to be underutilized, causing unnecessary reduced throughput.

Progressive download results in an aggressive (as fast as possible) download of video from the HTTP server over the network. This is another source of inefficient use of a network when a user selects a video for download, watches a short portion of the video, and then stops watching the video. Since the progressive download transmits the video stream as quickly as possible, unviewed packets may be transmitted over the network and accumulated at the client machine, only to be discarded after the user at the client stops watching the video. This wastes valuable network bandwidth and resources.

For these and other reasons, various adaptations of content streams are desired at the edges of various communications networks, wired or wireless. Various adaptation schemes include rate adaptation, content replacement, addition of textual content, and the like. More enjoyable content streaming at the receiving device, and more efficient use of the communications networks, could be achieved with efficient identification of content streams to be adapted in one way or another, for modification of content without the knowledge of the sending device or the receiving device.

SUMMARY

An intermediate device receives a content data message addressed to a receiving device for a communication session between a source device and the receiving device. The intermediate device substitutes adapted content data for content data of the content data message and then sends the adapted content data to the receiving device such that it appears to the receiving device that the adapted content data originated from the source device. In this way, the communication from the source device to the receiving device is intercepted by the intermediate device in a manner that is transparent to the source device and receiving device. The transparent interception preserves normal transmission protocol functioning, acknowledgement messages, and the like for the source and receiving devices, and supports seamless processing of the original content under the direction of the intermediate device. The transparent interception sets up two separate and independent communication sessions, one between the source device to the intermediate device, and another between the intermediate device and the receiving device. In another aspect, the operation of the intermediate device can be changed between a bridge mode and a divert mode.

Other features and advantages of the present invention will be apparent from the following description of the embodiments, which illustrate, by way of example, the principles of the invention.

Additional details are provided by the attached appendices, which are incorporated herein.

DETAILED DESCRIPTION

Figure 1:
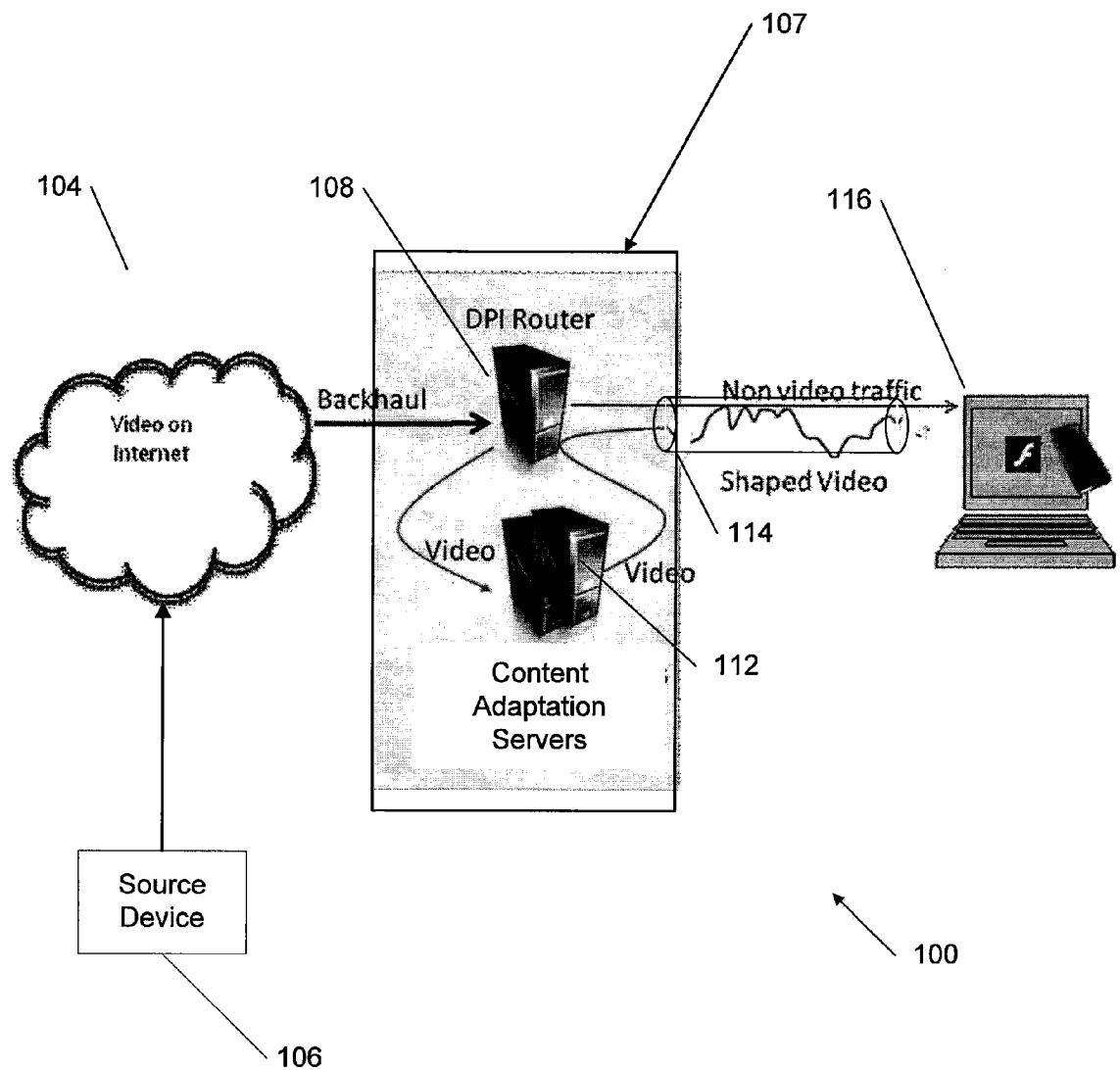
FIG. 1 is a high level functional block diagram of a system for managing download of streaming data.

FIG. 1 is a high level functional block diagram of a system 100 for enabling content adaptation of temporally ordered streaming data. In the illustrated system 100, a network 104 transports digital data from a source device 106 to an intermediate device 107 that receives the digital data. The network 104 could be a network such as the Internet, or could be a backhaul network for a cellular network, a satellite network, or other wireless network. The received digital data is intended for (addressed to) user equipment 116, such as a receiving device, but is intercepted by the intermediate device 107. The digital data received by the intermediate device 107 includes multiple types of data, including temporally-ordered content streams (referred to herein as content streams) such as video, audio, and combined audio/video. The intermediate device 107 may include one or more processing components or systems.

As described further below, data is intercepted in the FIG. 1 system at the intermediate device 107 in response to identifying a synchronize (SYN) message associated with establishment of a network connection to download a file from the source device 106 to the user equipment 116, such as a receiving device comprising a smartphone, table computer, or the like. The intermediate device 107 makes a connection entry in a connection table of the intermediate device for a first communication session with the receiving device, and a first confirmation is directed to the receiving device from the source device, the first confirmation indicating successful establishment of the first communication session between the receiving device and the source device. The first confirmation is forwarded by the intermediate device 107 to the receiving device 116. At least one first data segment is received at the intermediate device, comprising first data from the source device, the first data segment being directed to the receiving device as part of the first communication session. At least one second segment of data is created by substituting second data for at least a portion of the first data, the second data being different than the first data, and the at least one second segment is sent by the intermediate device 107 to the receiving device 116, the at least one second segment appearing to the receiving device as being from the source device and being part of the first communication session. The second segment of data can be paced at as low a data rate as required to fulfill data operations at the client. Also in some situations, the second segment of data may optionally be identical to the first segment of data as required to fulfill data operations at the client.

In the FIG. 1 embodiment, the intermediate device 107 includes a router 108 that is referred to as a Deep Packet Inspection (DPI) router. The DPI router 108 intercepts the digital traffic received from the network 104 at the intermediate device 107 and filters out the video content streams from other types of traffic. All the content stream video traffic and the other digital traffic, including, for example, HTML, JPEG, Binary Streams, and the like, is transferred over the network using the HTTP protocol. The DPI router 108 identifies and discerns desired content streams that are candidates for content adaptation from the other digital traffic that is not desired (i.e., traffic that is not to be adapted). This identification may be achieved, for example, based on the traffic type, or further narrowed down based on the MIME-type of the content embedded within the traffic type. The non-desired content stream traffic is forwarded from the DPI router 108 over a subnetwork 114 to user equipment 116. The user equipment 116 in this embodiment comprises a client machine, and may be a device such as a laptop computer, personal computer (PC), set-top box, netbook, cellular phone, smart phone, tablet computer, mobile Internet device (MID), and the like. The subnetwork 114 may include one or more wireless or wireline networks.

The DPI router 108 redirects the identified candidate content stream traffic to one or more content adaptation servers (CAS) 112. The system 100 of FIG. 1 includes two CASs 112, but other systems could include more or fewer CASs 112 as needed for desired operations. Multiple CASs 112 may be used to perform load balancing between them and to provide redundancy.

The CASs 112 manage adaptation of the content streams. In this example, the CASs manage transfer of the content streams between the sending devices and the receiving devices by buffering the content in input buffers, adapting the content, and forwarding the adapted content to an output buffer. The adapted content is then transferred to the receiving device. Because content adaptation can change the size of the content being delivered over the subnetwork 114, the sending device and the receiving device delivery protocols can become unsynchronized unless special care is taken at the CASs 112 or the DPI router 108.

Figure 2:
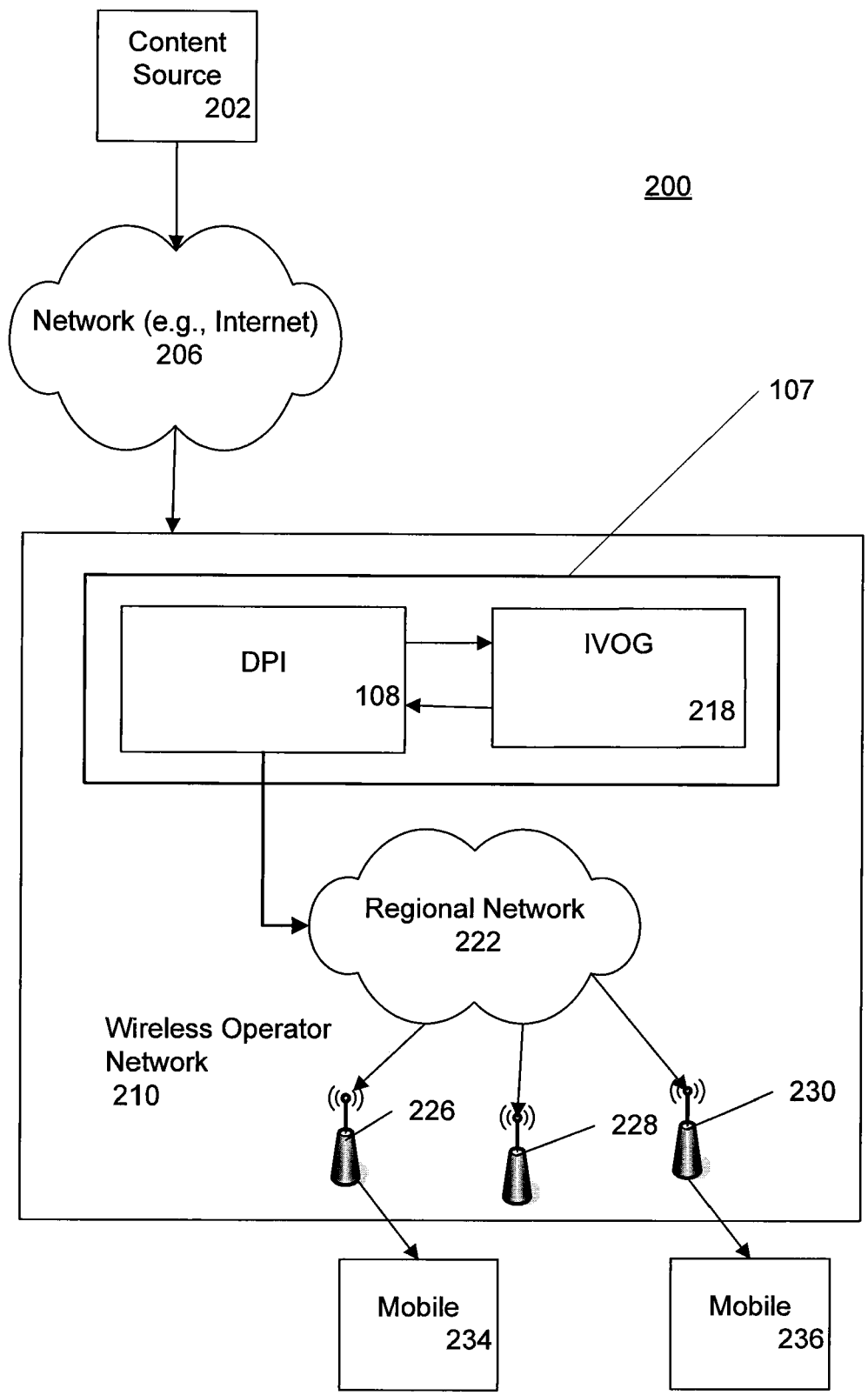
FIG. 2 is a functional block diagram of a system for managing download of streaming data in a wireless operator network.

Referring to FIG. 2, a functional block diagram of a system 200 for managing download of streaming data in a wireless operator network is shown. The system 200 includes a content source 202, a main network 206, and a wireless operator network 210. The wireless operator network is generally a proprietary, closed network for use by subscribers. The main network 206 can be, for example, the Internet. At an interface between the main network 206 and the wireless network 210, the intermediate device 107 including one or more of the DPI routers 108 discussed above receives data such as video data. The DPI router 108 controls the flow of data into a regional network 222 of the wireless operator network 210. The DPI router 108 and the regional network 222 can be located in what is referred to as a backbone of the wireless operator network 210. The regional network 222 is coupled to base stations 226, 228 and 230 of the wireless operator network 210. Three base stations 226-230 are illustrated in this example, but more or fewer base stations can be used. The base stations 226, 228, and 230 control the flow of data to user equipment comprising mobile devices 234 and 236 that are located in sectors or cells of the base stations 326-330.

The DPI router 108 is coupled to an internet video optimization gateway system (IVOG) 218. The IVOG system 218 includes subsystems such as CAS servers 112, which may include subsystems such as audio and/or video rate adapters. The DPI router 108 intercepts streamed content and forwards the intercepted data to the IVOG 218 for processing. The CASs 112 and audio and video rate adapters of the IVOG 218 process the data and return the processed data to the DPI router 108 for delivery to the regional network 222.

Figure 3A:
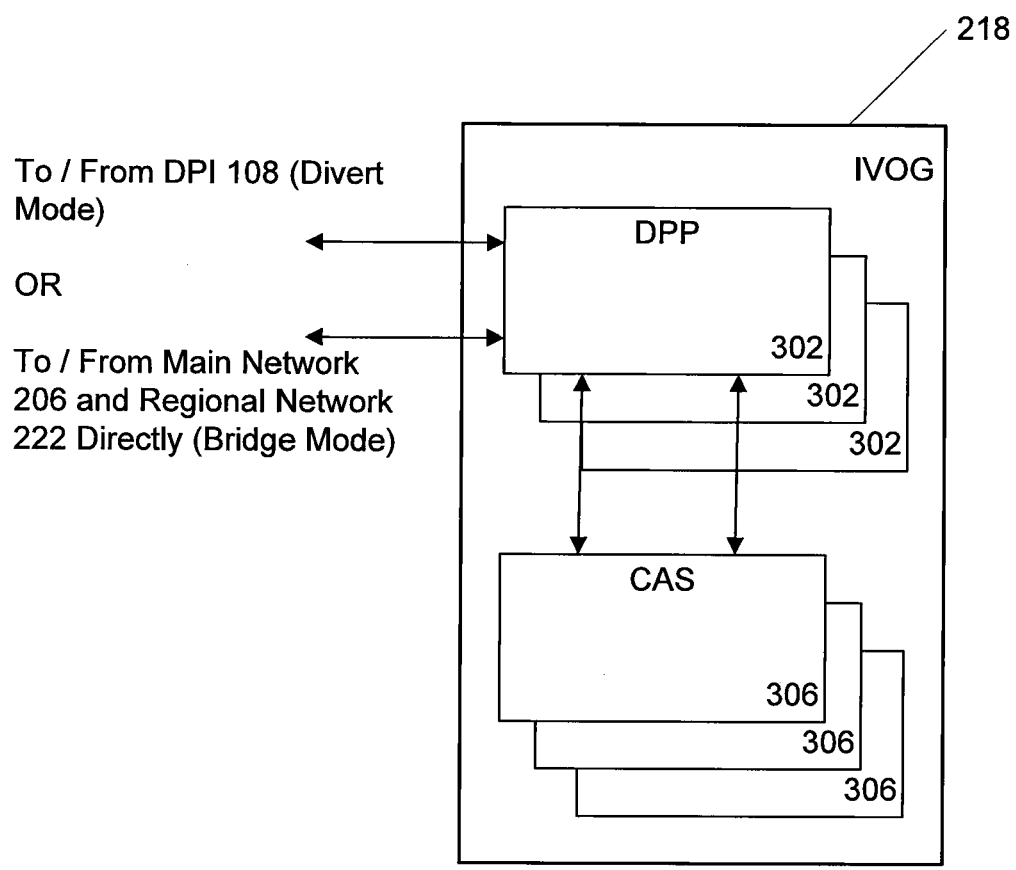
FIGS. 3A, 3B, and 3C are functional block diagrams of an illustration of subsystems of a video optimization gateway used in the system of FIG. 2.

FIG. 3A shows a functional block diagram of an illustration of subsystems of the IVOG system 218 used in the system 200 of FIG. 2. The IVOG system 218 is arranged in a stack with one or more data path processing (DPP) systems 302 on top, and one or more CASs 306 under the DPP systems 302. The CASs 306 can include audio and video adapters such as, for example, one or more video/audio rate adapters, video adapters that modify video to match an end-user's display mode, text insertion and/or provide picture-in-picture video etc. The DPP system 302 receives data intercepted by the DPI router 108. The DPP system 302 coordinates the processing of content streams to the one or more CASs 306. The CASs 306 then coordinate the re-encoding of video/audio and/or other content.

The CASs 306 can be coupled to rate adapters including audio and/or video rate adapters as well as audio an/or video re-encoders (to match a display mode of an end-user device, or simply combine additional video and/or audio.

The IVOG system 218 is illustrated in a divert mode in FIG. 2. In contrast to receiving content streams from the DPI router 108 in the divert mode, as illustrated in FIG. 2, the DPP system 302 can be configured in a bridge mode where all the data communicated to and from the main network 206 and the regional network 222 goes through the DPP system 302. In the bridge mode, multiple DPP systems 302 can use a load balancer such as a router implementing the Link Aggregation Control Protocol (LACP), or other load balancing protocol. LACP provides a method to control the bundling of several physical ports of multiple DPP systems 302 together to form a single logical channel. LACP allows a router (not shown) connected to multiple DPP systems 302 to negotiate an automatic bundling of links by sending LACP packets to the individual DPP systems 302. In the bridge mode, the DPP system 302 communicates data directly, or via a load balancing router, to and from both the main network 206 and to and from the regional network 222.

Figure 3B:
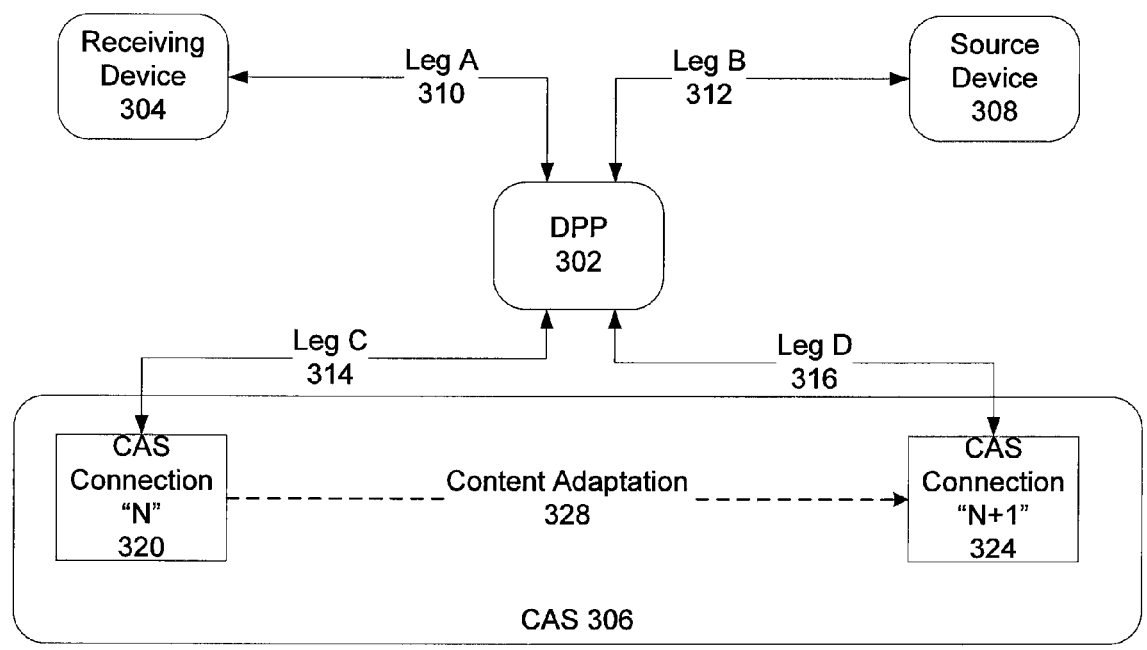

With reference to FIG. 3B, the DPP system 302 is shown in a bridge mode between a receiving device 304, a source device 308, and a CAS 306. FIG. 3B illustrates a topology of network "legs" or communication segments, which will be used in describing the processes described herein. In FIG. 3B, there are four distinct legs, which may be physical, logical, or some combination thereof. Leg A 310 represents a communication session over the network that is used for data transmission between the receiving device 304 and the DPP 302. Leg B 312 represents a communication session over the network that is used for data transmission between the DPP 306 and the source device 308. Leg C 314 represents a communication session over the network that is used for data transmission between the DPP 302 and the CAS 306. In this example, Leg C 314 connects a CAS connection "N" 320 to the DPP 302. Connection "N" 320 has been established between the DPP 302 and the CAS 306 in order to adapt content received on Leg B 312 from the source device 308 before sending the adapted content data to the receiving device 304. Upon performing a content adaptation operation 328 on content in the connection N 320, a CAS connection "N+1" 324 is established in the CAS 306. Leg D 316 is a section of network used for data transmission between the CAS connection N+1 324 and the DPP 302. The legs A 310, B 312, C 314, and D 315 are used hereafter to describe the data paths between the receiving device 304, the source device 308, the DPP 302 and the CAS 306. Each of the Legs A-D, 310, 312, 314 and 316 provide two-way communications between their respective end points.

With reference to FIGS. 2, 3A and 3B, the DPP system 302 is configured to identify content streams such as multimedia (audio, video and/or text), video streams, and/or audio streams that are being communicated from the main network 206 on Leg B 312(e.g., from the source device 308) to recipient devices on Leg A 310 (e.g., the receiving device 304). In the case of TCP, for example, a connection between the recipient device and the content source is normally established by an exchange of signaling messages between a respective one of the recipient devices and a content source. The signaling messages contain IP addresses of the receiving device 304 and the source device 308. Upon identifying a content stream that is eligible for content adaptation with the CAS 306, the DPP 302 and the CAS 306 establish the Leg C 314 and Leg D 315 connections between the DPP 302 and the CAS connection N 320 and the CAS connection N+1 324, respectively. A description of identifying a content stream on Leg A 310 and Leg B 312 will now be described using TCP signaling as an example, but other protocols could also be used.

When an original connection (communication session) is being established between the receiving device 304 and the source device 308, instead of simply forwarding connection establishment messages between the receiving device 304 and the source device 308, the DPP system 302 uses a man-in-the-middle configuration to create two diverted connections (between the DPP 302 and the CAS 306), where the two diverted connections remain hidden to the receiving device 304 and the source device 308, such that the receiving device 304 and the source device 308 are only aware of the original connection. The first diverted connection is established between the source device 308 and the CAS connection N 320 using sections of the network including Leg B 312 and Leg C 314. The second diverted connection is established between the receiving device 304 and the CAS connection N+1 324. After establishment of these two diverted connections, the CAS 306 can start to adapt the content, and the adaptation operation will be transparent to the receiving device and the CAS connection. By keeping the diverted connections transparent, the data transmission protocol (e.g., TCP) remains consistent. Otherwise, the transmission protocol could breakdown and a new connection would be initiated by the receiving device 304 or the source device 308, which is not desirable. A general description of establishment of the diverted connections in the DPP 302 will now be addressed.

Figure 3C:
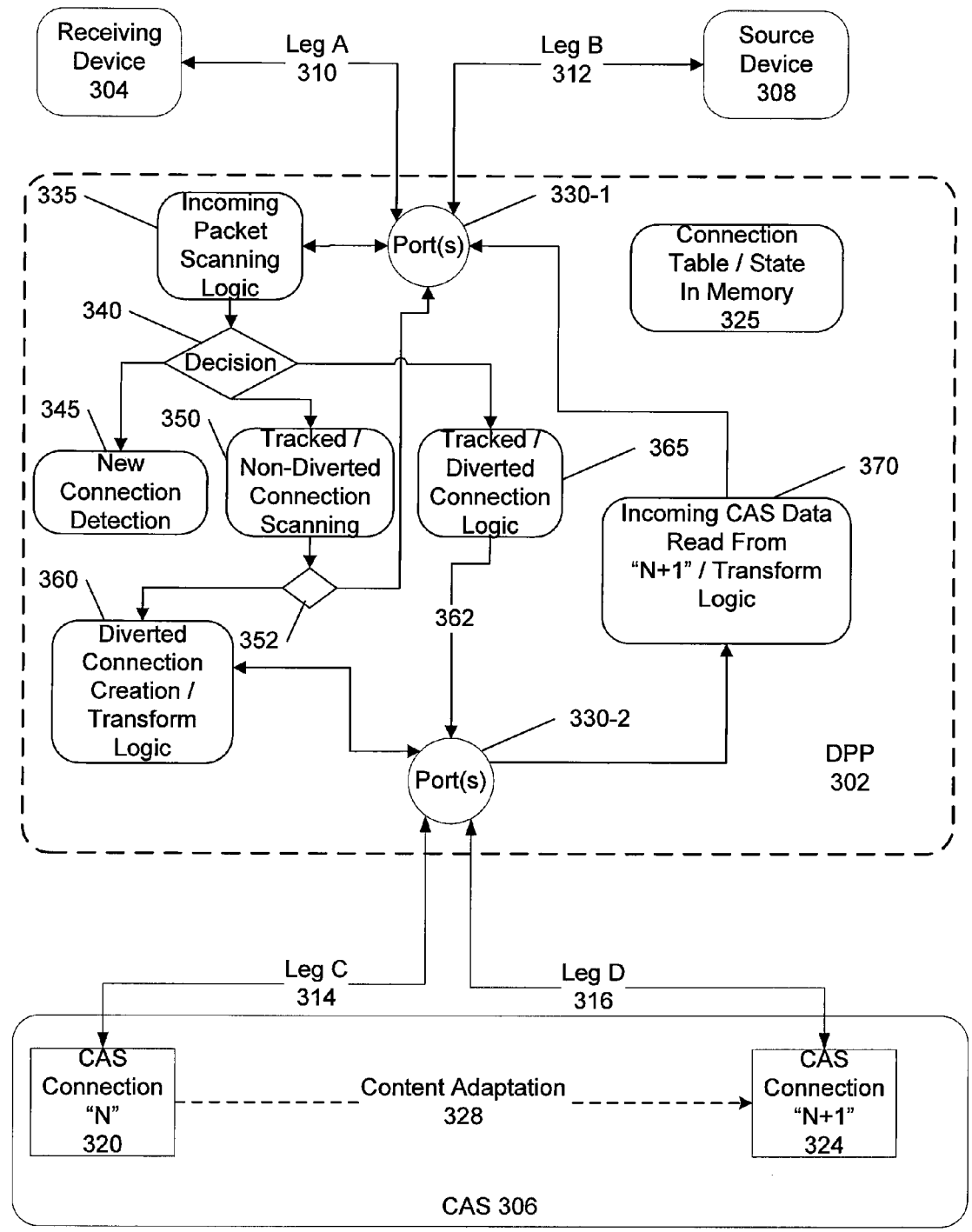

FIG. 3C shows a functional block diagram of the DPP 302 and its relationship to external elements such as the receiving device 304, the source device 308 and the CAS 306. The DPP 302 in FIG. 3C shows selected logical functions of the DPP 302. Also shown are the Leg A 310, Leg B 312, Leg C 314 and Leg D 316 connections from the DPP 302 to the receiving device 304, the source device 308, and the CAS 306. FIG. 3C is a simplification of the DPP 302 and is meant to convey key elements of the DPP 302. The DPP 302 of FIG. 3C is shown in the bridge mode. Alternatively, a DPI 108 could be located between the DPP 302, the receiving device 304, and the source device 308, in a fashion similar to the divert arrangement shown in FIG. 2. In the divert arrangement, Leg A 310 and Leg B 312 would pass through the DPI 108.

Referring to FIB. 3C, the DPP 302 is serving as a network bridge, scanning network connections between two networks (e.g., the main network 206 and the wireless operator network 210, as shown in FIG. 2) In this example, only the source device 308 and the receiving device 304 are shown, where either one could be in either of the networks being bridged by the DPP 302.

Network data travels to and from the DPP 302 and the receiving device 304 along Leg A 310, and to and from the source device 308 along Leg B 312. Leg A 310 and Leg B 312 are terminated at the DPP 302 at one or more network ports 330-1. In some embodiments, one network port 330-1 is used, while in other embodiments two or more network ports 330-1 are used. For example; a DPP 302 could use two network ports 330-1, referred to herein as port A and port B, where port A handles ingress data from a first network and egress data to the first network, and Port B handles ingress data from a second network and egress data to the second network. Note that in FIG. 3C, network ports A and B are not explicitly shown and are members of the network ports 330-1. A DPI 108 could be used as the bridge between the receiving device 304 and the source device 308 and divert a percentage of the traffic to the DPP 302, in what is referred to as a "bump in the wire" (BITW) arrangement.

FIG. 3C will be described with respect to traffic being transported to and from the receiving device 304 and the source device 308. However, the DPP 302 can support multiple data connections between multiple end devices, where each data connection is treated in manner similar to the manner described herein for the connection between the source device 308 and the receiving device 304. As network data ingresses the DPP 302 through the network ports 330-1 connected to Leg A 310 and Leg B 312, the network data is examined according to the high level flow denoted in FIG. 3C. The DPP 302 may be configured to inspect a percentage of network data flows between the source device 308 and the receiving device 304. At block 335, each incoming packet, or a percentage of incoming packets, is scanned to determine if it is a packet of interest (that is, a packet from a desired content stream). If at block 335 a scanned packet is determined to be of interest, then the packet is forwarded to decision block 340, otherwise the packet is returned to one of the network ports 330-1 and forwarded to its intended destination which is either the receiving device 304 or the source device 308. At decision block 340, the DPP 302 determines which category of connection the forwarded packet falls into. Each forwarded packet will fall into one of three distinct categories; either a new connection, a tracked connection that is currently non-diverted (not adapted by the CAS 306), or a tracked and diverted (being adapted by the CAS 306) connection.

When a new connection is observed at decision block 340, the packet is forwarded to block 345 where a new connection entry is created in the connection table 325, and the packet is forwarded to its intended destination which is the receiving device 304 or the source device 308 via the network port 330-1. At this point any future packets associated with this connection that are scanned at block 335 will be determined to be tracked and not diverted.

When a packet is determined at the decision block 340 to be associated with a connection that is being tracked and is not diverted, the packet is forwarded to block 350, where the DPP 302 scans the connection and determines, at decision block 352, whether or not to "divert" the connection for content adaptation with the CAS 306 via one or more network ports 330-2. If the DPP 302 decides, at decision block 352, to divert the connection, the logic at block 360 is executed, otherwise the packet is forwarded to the network via the network port 330-1. At block 360, the DPP 302 establishes a new network connection N 320 on Leg C 314 with the CAS 306, and subsequently accepts a new connection N+1 324 from the CAS 306 on Leg D 316, wherein connection N 320 and connection N+1 324 are considered a logical pair. In some embodiments, where the network protocol is TCP, N refers to the source port number chosen by the DPP 302 for the initial establishment of connection N 320, and N+1 refers to the next incremental port number. For example if port 24000 is chosen by the DPP 302 as N, then, when the CAS 306 initiates connection N+1 324, the connection N+1 will connect to the DPP on port 24001. This implies at least the following two facts: that the DPP 302 pre-allocates resources for ports N and N+1 in advance of making the connection N 320, and that N and N+1 are related, and that a relationship between the two connections N 320 and N+1 324 is maintained within the DPP 302 in the connection table 325.

After a connection is diverted, all new data packets ingressing the DPP 320 on that connection will be channeled to the logic block 365 by the decision block 340. At this point, these data packets are first transformed to conform to the N connection 320 semantics, and then are written to the CAS 306 on the N connection 320, indicated by the arrow 362. Acknowledgment messages to the prior referred data transmissions, of the connection N from the CAS 306 received on Leg C 314, are transformed at block 360 and forwarded to the source device 308, such that they appear to have originated directly from the receiving device 304.

As a data packet ingresses the DPP 302, via one of the network ports 330-2 from the CAS 306 on the "N+1" connection 324 on Leg D 316, at block 370, transforms and transmits the packet to the receiving device 304 in such a way that it appears to have originated directly from the source device 308.

In some preferred embodiments the network protocol used between the DPP 302 and other network entities is TCP, or a similar stateful protocol. When the protocol used by the DPP 310, et. al. is TCP or a similar protocol, the transformation process, at blocks 360 and 370, between TCP flows enables the DPP 302 to perform transparent routing between all three network endpoints (the receiving device 302, the CAS 306 and the source device 308, without needing to maintain a fully stateful implementation of the network protocol stack.

Figure 4:
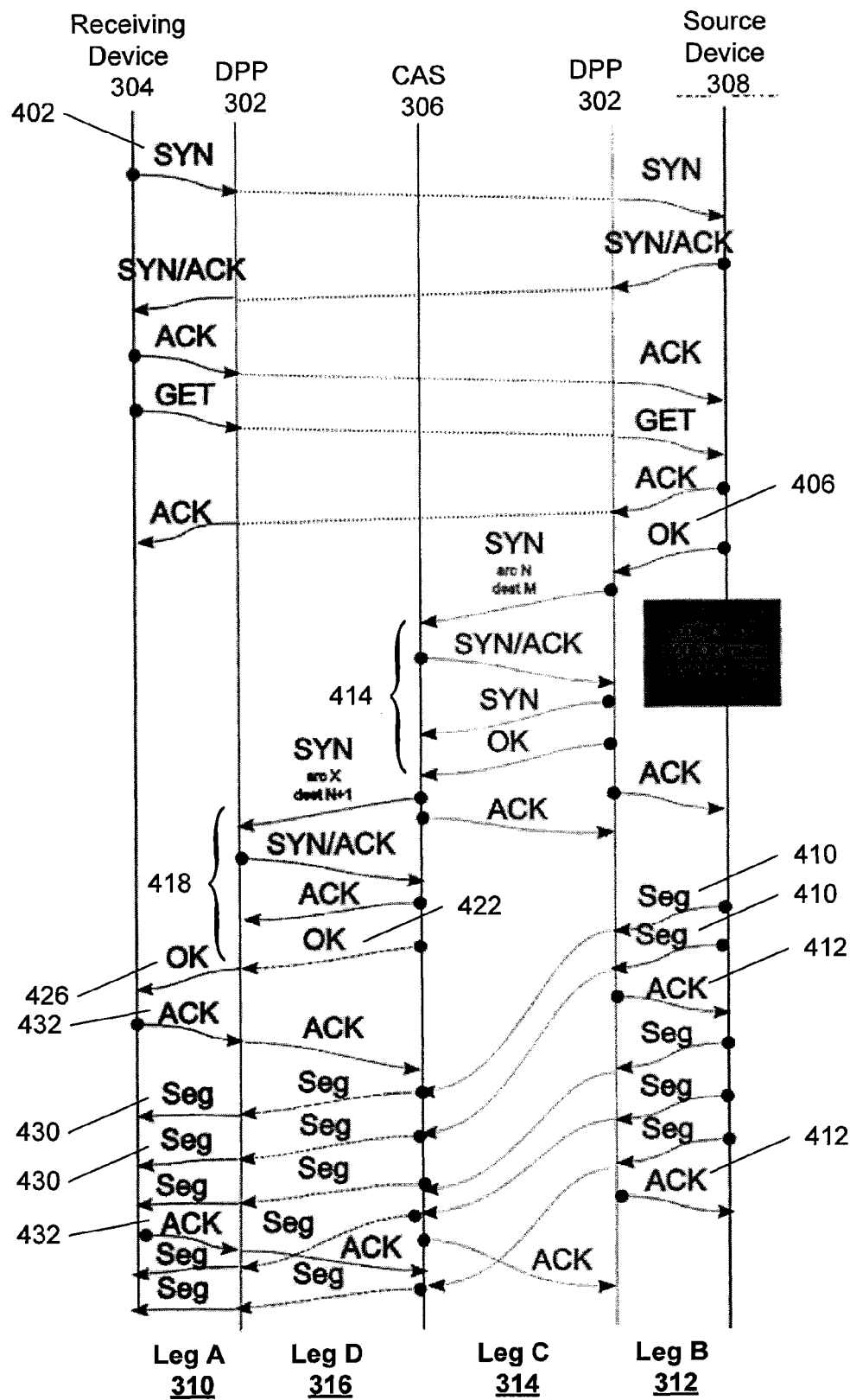
FIG. 4 is a signal flow diagram illustrating an example of signaling between a content source and a content recipient used in the system of FIGS. 3A-3C.

FIG. 4 is a signal flow diagram illustrating an example of TCP signaling between the content source 308 and the receiving device 304 with the DPP 302 intercepting the messages to provide two diverted connections. The source device 308 and the receiving device 304 can be in different networks such as, for example, the main network 206 and the regional network 222 as shown in FIG. 2. The source device 308 can be in either network and the receiving device 304 can be in either network.

The DPP 302 searches (see description of block 335 above) for a SYN message 402 that the receiving device 304 has transmitted to the source device 308 to establish a new connection. The SYN message 402 contains the IP addresses of the source device 308 and the receiving device 304. After identifying the SYN message 402, the DPP 302 makes a connection entry in the connection table 325 for a communication session between the source device 308 and the receiving device 304. Subsequent to identifying the SYN message 402, the DPP 302 searches for a "200_OK" response 406 from the source device 308 directed to the receiving device 304. A "200_OK" response is a standard response for a successful HTTP request. Up to this point, the CAS 306 is being bypassed and the connection between the receiving device 304 and the source device 308 comprises Leg A 310 and Leg B 312 as shown in FIGS. 3B and 3C.

Upon identifying and intercepting the 200_OK response 406, the DPP 302 initiates a first hand-shake protocol 414 with the CAS 306 to create a first diverted connection "N", on Leg C 314, between the DPP 302 and the CAS 306. The CAS 306 then initiates a second hand-shake protocol 418 with the DPP 302 to create a second diverted connection "N+1", on Leg D 316, between the CAS 306 the DPP 302.

Upon establishment of the first and second diverted connections "N" and "N+1", on Leg C 314 and Leg D 316, respectively, between the CAS 306 and the DPP 302, the DPP 302 receives a second 200_OK response 422 from the CAS 306, confirming establishment of the Leg D 316 connection with the CAS 306. The DPP 302 repackages the second 200_OK response 422 into a third 200_OK response 426 to look like it came from the content source 308 and sends the repackaged third 200_OK response 426 to the receiving device 304. The final result is a first diverted TCP connection, comprising Leg B 312 and Leg C 314, between the CAS 306, the DPP 302 and the content source 308, and a second diverted TCP connection, comprising Leg A 310 and Leg D 316, between the CAS 306, the DPP 302 and the receiving device 304. Initially, the two diverted TCP connections have the same sequence numbers as the original connection, Leg A 310 and Leg B 312. However, as the CAS 306 adapts the content, the number of packets may change and separate connection state information, such as initial sequence numbers, data bytes received, and additional connection state information which is well known to those skilled in the art of network packet processing are maintained by the DPP 302 in the connection table 325 for each Leg. The DPP system 302 translates the sequence numbers by offsets to coincide with the segments being sent to the receiving device 304. Using this man-in-the-middle technique, the original connection, Leg A 310 and Leg B 312, between the content source 308 and the receiving device 304 is essentially hijacked and replaced by a first diverted connection, Leg B 312 and Leg C 314, and a second diverted connection, Leg A 310 and Leg D 316.

After identifying the first 200_OK response 406, the DPP 302 begins searching Leg B 312, at block 335 in FIG. 3C, for first content segments 410 that the content source 308 is passing to the receiving device 304. The DPP 302 responds to receiving the first content segments 410 by sending first ACK messages 412 to the content source 308. The first ACK messages 412 originate as ACK messages sent from the CAS 306 to the DPP 302 (not shown), and are translated by the DPP 302 to appear to the content source 308 as if they originated at the receiving device 304. The DPP 302 forwards the first content segments 410 to the CAS 306, over the Leg C 314, and the CAS 306 modifies the content using one or more methods such as adding content, removing content, reformatting the content and/or rate adapting the content, for example. The CAS 306 then sends the modified content segments 430 to the DPP 302 over the Leg D 316 to be sent to the recipient device over the Leg A 310. The receiving device 304 sends second ACK messages 432 back to the DPP 302 in response to successfully receiving the modified content segments 430.

Figure 5:
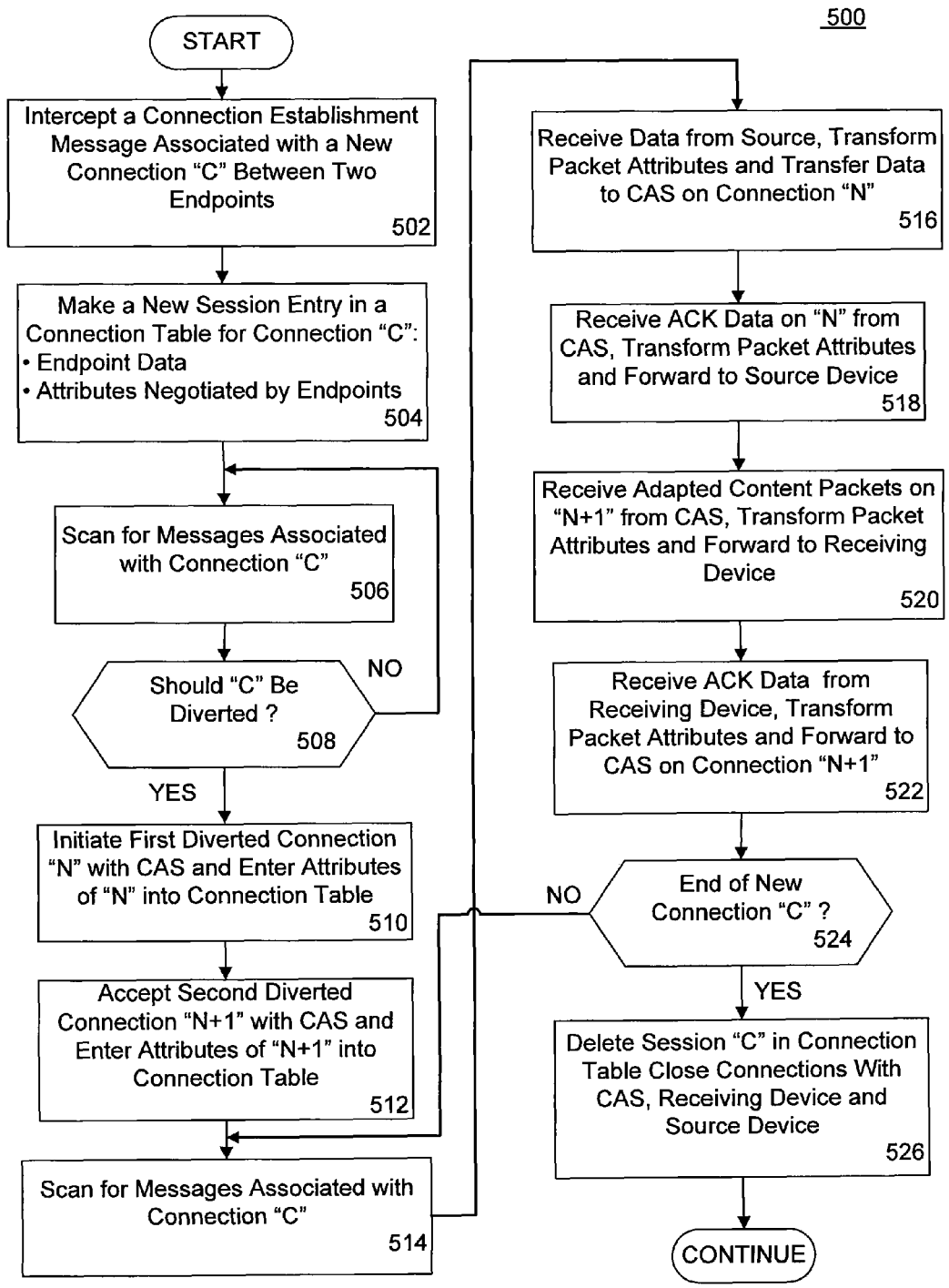
FIG. 5 is a flow diagram of operations performed by a data path processing subsystem of the system of FIGS. 3A-3C.

FIG. 5 is a flow diagram of a process 500 performed by the DPP 302 for diverting a network connection for content adaptation. Prior to diverting a connection for adaptation, network data is flowing through the DPP 302, much like data flows through a common network switch or router. Data that enters the DPP 302 is referred to as "ingressing" the DPP and is termed "ingress data", while data that leaves the DPP 302 is said to be "egressing" the DPP and is termed "egress data". As network data ingresses the DPP 302, the DPP 302 inspects the traffic flowing through it, and typically forwards the data through it, or egresses the data, which it deems non-interesting, or undesired. Data which the DPP 302 deems to be of potential interest is inspected further. The process involves detecting new network connections of potential interest, diverting the connection to the CAS 306, receiving the processed data from the CAS 306, and forwarding the processed data back to the original intended network entity in such a way that the original network entities in communication on the original connection are unaware of the presence of the DPP 302 or the CAS 306 processing the data. When the connection ends, the DPP 302 also negotiates the graceful teardown of the connections in such a way that the original network entities are unaware of the presence of the DPP 302.

Referring to FIGS. 3C, and 5, the process 500 starts at step 502, where the DPP 302 detects the presence of a new connection "C" which is of potential interest. Detection of the new connection "C" can include intercepting a connection establishment message (e.g., a SYN message in the case of the TCP protocol). The existence of the connection "C" is recorded in a new row of the connection table 325, e.g. in row "i", which has multiple columns. As the network connection "C" is setup, as is typical within the scope of network protocols, certain endpoints have certain capabilities and inform their remote parties of those capabilities during the setup process. Furthermore, in some network protocols, a level of negotiation takes place where one party will present its supported options and the other party will reply with its preferred choice. In this example, the endpoints are the receiving device 304 and the source device 308. The intercepted connection establishment message is forwarded to the intended endpoint by the DPP 302.

At block 504, using information in the connection establishment message, the DPP 302 stores connection attributes of the source device 308 {source device attributes include, for example, $s_1, s_2, \ldots, s_n$} and the receiving device 304 { receiving device attributes include, for example, $r_1, r_2, \ldots, r_n$} in row "i" of the connection table 325. The number of attributes recorded depends on the particular network protocol in use. For example, in the case of the TCP protocol, the Maximum Segment Size (MSS) and Window Scale elements of each connection, along with the starting sequence numbers of the connections are recorded, along with other attributes of the connection.

At block 506, the DPP 302, scans traffic passing to and from Leg A 310 and Leg B 312. As the DPP 302 is scanning traffic, using the scanning logic 335 of FIG. 3C, associated with new connection "C", the DPP 302 makes a decision, at decision block 508, whether or not to begin diverting the content in connection "C" to an external device for processing. In the present example, the external device is the Content Adaptation Server (CAS) 306. In some embodiments the DPP 302 may examine the data for specific content prior to making the decision to divert the connection traffic, while in other embodiments the DPP 302 may make the decision to immediately begin diverting the connection traffic immediately after, or at some fixed or computed time after the connection was observed. If the decision at block 508 is negative, the DPP 302 continues to scan for messages associated with connection "C" at block 506, or terminates the scanning after a it has been determined that the connection "C" is not of interest.

Upon determining to divert the connection "C", the process 500 continues at block 510, where the DPP 302 initiates a first diverted connection "N" to the CAS 306, over Leg C 314, using selected source device attributes of the connection details of the source device 308 recorded for the connection "C" in the connection table 325.

Proceeding to block 512, the DPP 302 accepts a second diverted connection "N+1" from the CAS 306, over Leg D 316, using selected receiving device attributes of the connection details of the receiving device 308 recorded in the connection table 325. At this point, the DPP 302 has converted the new connection "C" into two hybrid or diverted connections, referred to herein as first and second diverted connections. A first diverted connection comprises the connection "C" between the DPP 302 and the source device 308 over Leg B 312 and the connection "N" between the DPP 302 and the CAS 306 over Leg C 314. A second diverted connection comprises the connection "C" between the DPP 302 and the receiving device 304 over Leg A 310 and the connection "N+1" between the DPP 302 and the CAS 306 over Leg D 316.

Upon establishing the connections "N" and "N+1" with the CAS, the process 500 proceeds to block 514, where the DPP 302 continues to scan incoming traffic on both Leg A 310 and Leg B 312 for data associated with connection "C". At block 516, the DPP 302 forwards data associated with connection "C" that the DPP 302 has received from the source device 308, via Leg B 312, to the CAS 306 on the connection "N" via Leg C 314. As packets are forwarded to the connection "N" of the CAS 306, the packet headers (not the data) are transformed from the semantics of the connection "C" with the source device 308 to conform to the semantics of the connection "N."

At block 518, any acknowledgement responses or other data sent to the DPP 302 on connection "N" from the CAS 306 are transformed from the semantics of the connection "N" with the CAS 306 to conform to the semantics of the connection "C" with the source device 308 and forwarded to the source device 308, so that they appear as if they originated from the receiving device 304.

At block 520, the DPP 302 receives adapted data from the CAS 306 on the "N+1" connection after the CAS 306 has inspected and potentially modified the data for the particular application level use-case at hand. The DPP 302 transforms said data from the semantics of the connection "N+1" with the CAS 306 to conform with the semantics of the connection "C" with the receiving device 304 and forwards the adapted data to the receiving device 304 in such as way that it appears to have originated from the source device 308. Again, this is performed by transforming network transmission details of the "N+1" connection into network transmission details expected by the receiving device 304 on the original connection "C" intercepted in step 502.

At block 522, the DPP 302 receives acknowledgement packets and/or any other data packets from the receiving device 304, transforms the packet semantics according to the data stored in the connection table 325, and forwards the acknowledgement packets to the CAS 306 on the "N+1" connection. Any packet retransmissions will also be sent by the CAS 306, to the DPP 302 and forwarded to the receiving device 304 at block 520.

At decision block 524, the DPP 302 determines if the current communication session including connections "N" and "N+1" has concluded. If the end of the content of the connection "C" is determined not to be complete at decision block 524, the process 500 continues back to block 514 to continue to perform the functions of blocks 514, 516, 518, 520, 522 and 524. The DPP 302 continues to forward data between all legs of network communication: (1) { source device to/from "N" connection} and (2) { receiving device to/from "N+1" connection}. As the DPP 302 performs these operations, it also watches for signals that indicate the desire to close the connection. If the end of the content has been reached, the process 500 proceeds to block 526. At block 526, the connection "C" recorded in the connection table 325 is terminated and the associated entries are removed, thus closing connections "C," "N," and "N+1" with the CAS 306, the receiving device 304 and the source device 308.

Figure 6A:
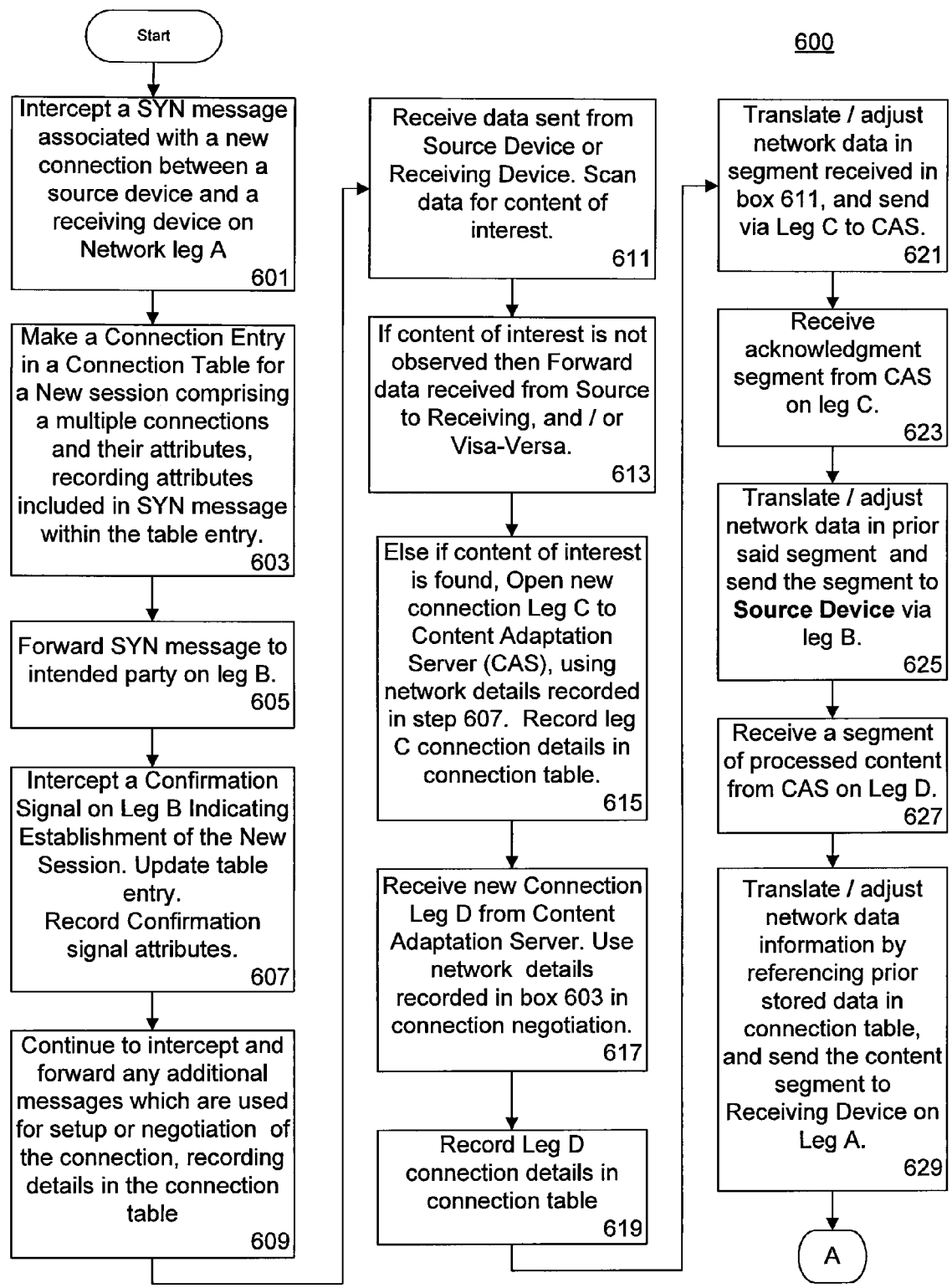
FIGS. 6A and 6B are flow diagrams of operations performed by the data path processing system of the system of FIGS. 3A-3C.
Figure 6B:
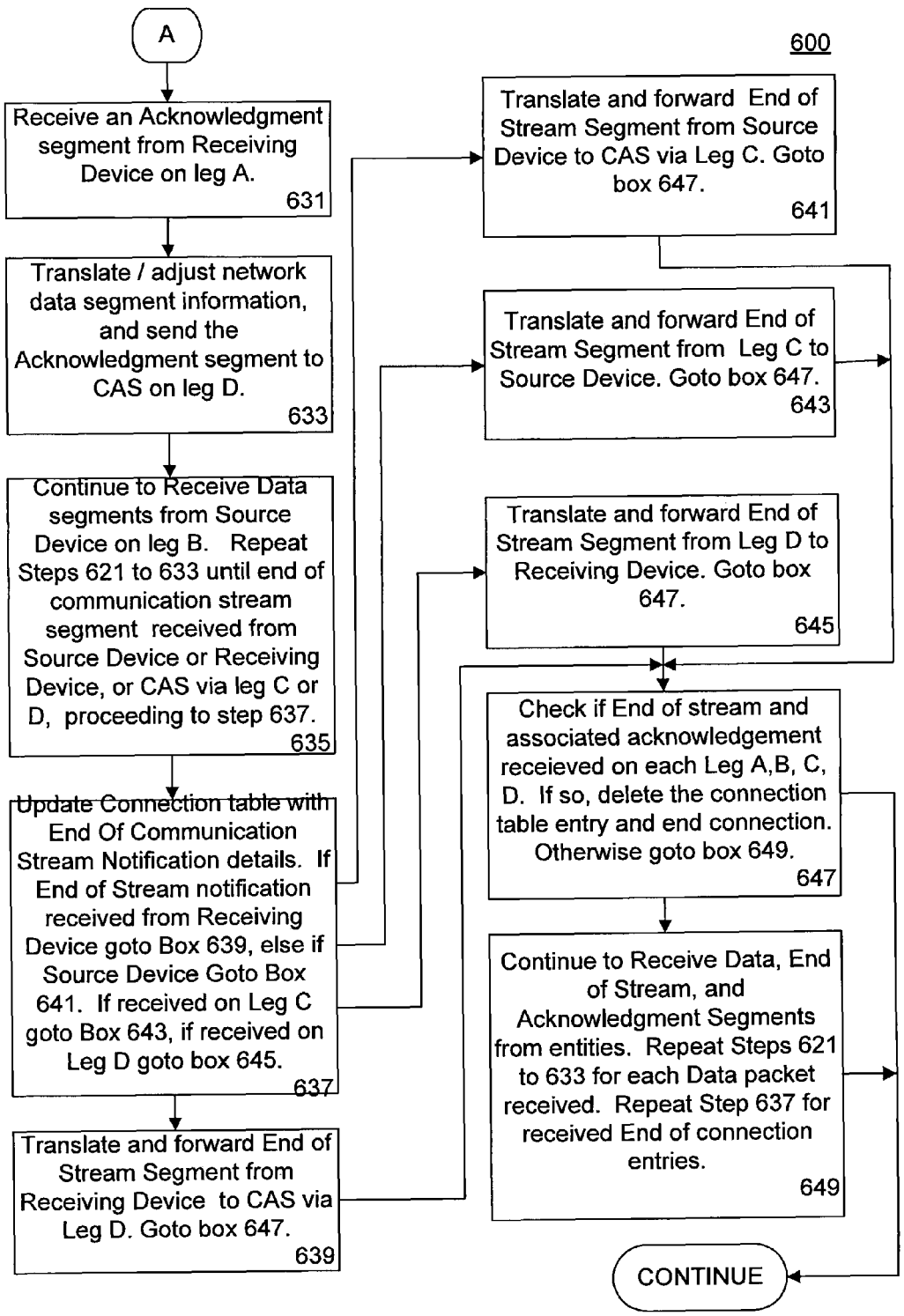

FIGS. 6A and 6B are flow diagrams of a process 600 performed by the DPP 302 for diverting a network connection for content or network adaptation, where the process 600 is particularly geared toward connections that utilize the TCP protocol. As discussed in reference to FIG. 4 above, the start of a TCP connection attempt is denoted by the presence of the SYN flag being set in the packet header from one network device to another. Referring to FIGS. 3C and 6, the process 600 begins at step 601, where the DPP 302 intercepts a SYN message between the source device 308 and the receiving device 304 on network leg A 310. In step 603 a connection entry for this new connection "C" is recorded in connection table 325, along with the details of the SYN message. Next, in step 605 the SYN message is forwarded to the source device 308 by egressing the DPP302 via network leg B. Next, in step 607, the DPP 302 intercepts a SYN/ACK message from the source device 308, which is a confirmation message indicating that the new connection has been established with the source device 308. At this point, the connection table 325 is updated as such. Attributes of the network connection (both sides; the receiving and source sides) are recorded in the connection table 325.

At this point, the DPP 302 continues to scan all ingress network data. At step 609, any additional messages used for setup or negation of connection "C" between the source device 308 and the receiving device 304 are forwarded to the appropriate device and details, as needed, are recorded in the connection table 325. As the DPP 302 scans this data, and when it detects network data in a tracked connection, the DPP 302 then scans the content of the packets for data of interest in step 611. In step 613, when the DPP 302 does not observe content of interest, it forwards the data to the intended party. For example network data observed as sent from the receiving device 304 is forwarded to the source device 308, and visa-versa.

At step 615 the DPP 302 observes data of interest while scanning, and opens a new network connection along network Leg C 314 to the CAS 306. This network connection is referred to as "N." As the connection "N" is established, details are recorded in the connection table 325, and an association is maintained between this new connection "N" and the original connection "C" established in steps 601-607.

In step 617, the DPP 302 receives an incoming network connection along network leg "D" as initiated by the CAS 306, and records details of this network connection in the connection table 325. This network connection is referred to as "N+1." At step 619, the DPP 302 records connection "N+1" details in connection table 325 and an association is maintained in the connection table 325 between this network connection "N+1" and the original network connection "C" established in steps 601-607. Furthermore, an association is maintained in the connection table 325 between the "N" network connection on leg C 314 and the "N+1" network connection on leg D 316.

At step 621, the DPP 302 sends the data it received while scanning in step 615 to the CAS 306 via network connection "N" on leg C 314. Prior to sending the data, the DPP 302 transforms the packet headers to conform to the "N" network connection in leg C 314. This transformation process involves many things, but in particular: the window size is appropriately translated, along with adjustments to the sequence numbers of the "N" connection. Specific details in the IP headers may also need to be modified, such as removal or addition of data within the IP headers (which are located just prior to the TCP headers). Furthermore, specific details in the Ethernet headers are replaced in order to enable IP routing.

At step 623, the CAS 306 sends an acknowledgement message to the DPP 302. In step 625 the DPP 302 transforms the acknowledgment segment based on the information contained in the connection table 325 and transmits the acknowledgement to the source device 308 via network leg B 312.

At step 627, the DPP 302 receives an adapted data packet processed by the CAS 306 on the "N+1" connection via leg D 316. Prior to this event, more data may ingress the DPP 302 from the source device 308. If this occurs the DPP 302 will perform steps 621 and 623 as these related data packets arrive, respectively. After the DPP 302 receives adapted first data packet from the CAS 306 at step 627, the process 600 proceeds to step 629.

At Step 629, the DPP 302 transforms the adapted data packet headers to conform to the receiving device 304 network connection "C" as previously described. The DPP 302 forwards the adapted data packet to the receiving device 304 via Leg A 310.

At step 631, the DPP 302 receives, on Leg A 310, a response acknowledgment packet from the receiving device 304 as a result of the DPP 302 transmitting the adapted packet at step 629.

At step 633, the DPP 302 transforms the response acknowledgement packet received in step 631 and translates the headers to conform to the "N+1" connection maintained on network connection Leg D 316, then transmits the acknowledgement packet to the CAS 306 on Leg D 316.

At step 635, the DPP 302 continues to receive data segments from the source device 308 on Leg B 312, and repeats the steps 621 through 633 until an end-of-stream message is received. Typically, in the embodiment where the network protocol is TCP, this end-of-stream message has either the FIN flag set or the RST flag set.

At step 637, the DPP 302 detects an end of stream message. The DPP 302 updates the connection table 302 with the specific leg and connection this message was observed on. It is noteworthy to mention that the end of stream message arrives as a network packet, and is hereafter referred to as the end of stream packet. If the end of stream packet was received from the receiving device 304, the process 600 proceeds to step 639, else if the end of stream packet was received from source device 308 the process 600 proceeds to step 641, else if the end of stream packet was received on connection "N" via Leg C 314, then the process 600 proceeds to step 643, else if the end of stream packet was received on connection "N+1" via Leg D 316, the process proceeds to step 645.

At step 639, the DPP 302 transforms and forwards the end of stream packet from the receiving device 304, to the CAS 306 via Leg D 316 on Connection "N+1", and the process 600 continues at step 647.

At step 641, the DPP 302 transforms and forwards the end of stream packet from the source device 308 to the CAS 306 via the "N" connection on Leg C 314, and the process 600 continues at step 647.

At step 643, the DPP 302 transforms and forwards the end of stream packet from Leg C 314 on Connection "N" to the source device 308, and the process 600 proceeds to step 647.

At step 645, the DPP 302 transforms and forwards the end of stream packet from Leg D, Connection N+1, to the receiving device 304 on Leg A 310, and the process 600 continues at step 647.

At step 647, the DPP 302 checks to see if end of communication stream messages have been received on all legs for the referenced group of connections, as well as acknowledgment messages corresponding to each of end of communication stream messages. This corresponds to eight entries: four end of stream messages and four acknowledgment messages directly corresponding to the four end of stream messages. When all eight entries have been observed, then the connections "C," "N" and "N+1" are terminated and the DPP 302 continues to monitor other active connections using the process 600. Otherwise the process 600 continues to step 649.

At step 649 the DPP 302 continues to receive data on all connections which are still open and have not yet been closed. The DPP 302 repeats steps 621 through 637 for each data packet received. In addition, the DPP 302 continues to scan for end-of-stream messages and execute step 637 as these are detected.

After terminating the connections at step 647, any network data arriving at the DPP 302 that is associated with one of the terminated connections is discarded by the DPP 302 and hence not forwarded. Alternatively, this post-termination network data can be forwarded by the DPP 302 to the appropriate device in a transparent fashion.

The process 600 is based on the TCP protocol. However, the process 600 is applicable to other protocols. For example, Frame Relay is another protocol used in wide area networks which process 600 could accommodate. Frame Relay specifies the physical and logical link layers of digital communication channels using a packet switching technology and was originally developed for transport across Integrated Services Digital Network (ISDN) infrastructure. The Frame Relay protocol could be used in the context of other network interfaces.

In one embodiment, a computer system (such as the DPP 302 of FIGS. 3A-3C) is used to perform methods as described herein. According to a set of embodiments, some or all of the procedures of such methods are performed by the computer system in response to processor of the system executing one or more sequences of one or more instructions (which might be incorporated into the operating system and/or other code of the computer system, such as an application program) contained in working memory of the computer system. Such instructions may be read into the working memory from a machine-readable medium, such as one or more storage devices. Merely by way of example, execution of the sequences of instructions contained in the working memory might cause the DPP 302 to perform one or more procedures of the methods described herein.

Exemplary Hardware

The systems and methods described above may be implemented in a number of ways. One such implementation includes computer devices having various electronic components. For example, components of the systems in FIGS. 1, 2, 3A, and 3B may, individually or collectively, be implemented with devices having one or more Application Specific Integrated Circuits (ASICs) adapted to perform some or all of the applicable functions in hardware. Alternatively, the functions may be performed by one or more other processing units (or cores), on one or more integrated circuits or processors. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific computer processors.

Figure 7:
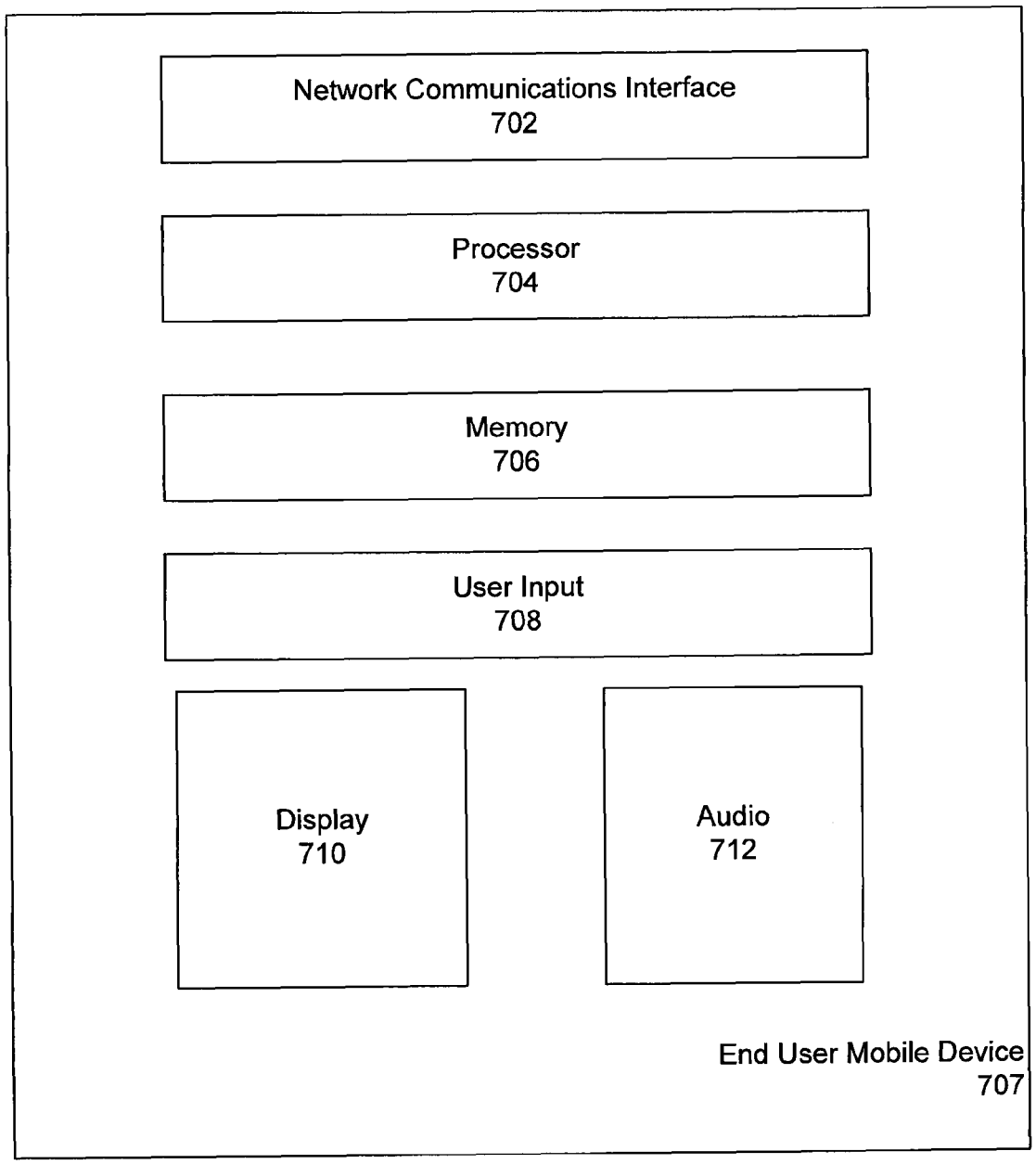
FIG. 7 is a block diagram of a mobile device, such as the devices illustrated in FIG. 1 and in FIG. 2, for use in the system described herein.

FIG. 7 is a block diagram of a mobile device 700 such as one of the end user devices 116 illustrated in FIG. 1 and mobiles 234, 236 illustrated in FIG. 2. The mobile device 700 includes a network communications interface 702 through which the mobile device communicates with the other system components as illustrated in FIG. 1 and FIG. 2. A processor 704 controls operations of the mobile device 700. The processor comprises computer processing circuitry and is typically implemented as one or more integrated circuit chips and associated components. The mobile device includes a memory 706, into which user activity, installed applications, and personal data can be stored. A user input component 708 is the mechanism through which a user can provide controls, responses, and data. The user input component 708 can comprise, for example, a keyboard or numeric pad, a voice microphone, a touch-sensitive display, or other input mechanism for providing user control and data input. A display 710 provides visual (graphic) output display and an audio component 712 provides audible output for the mobile device.

Figure 8:
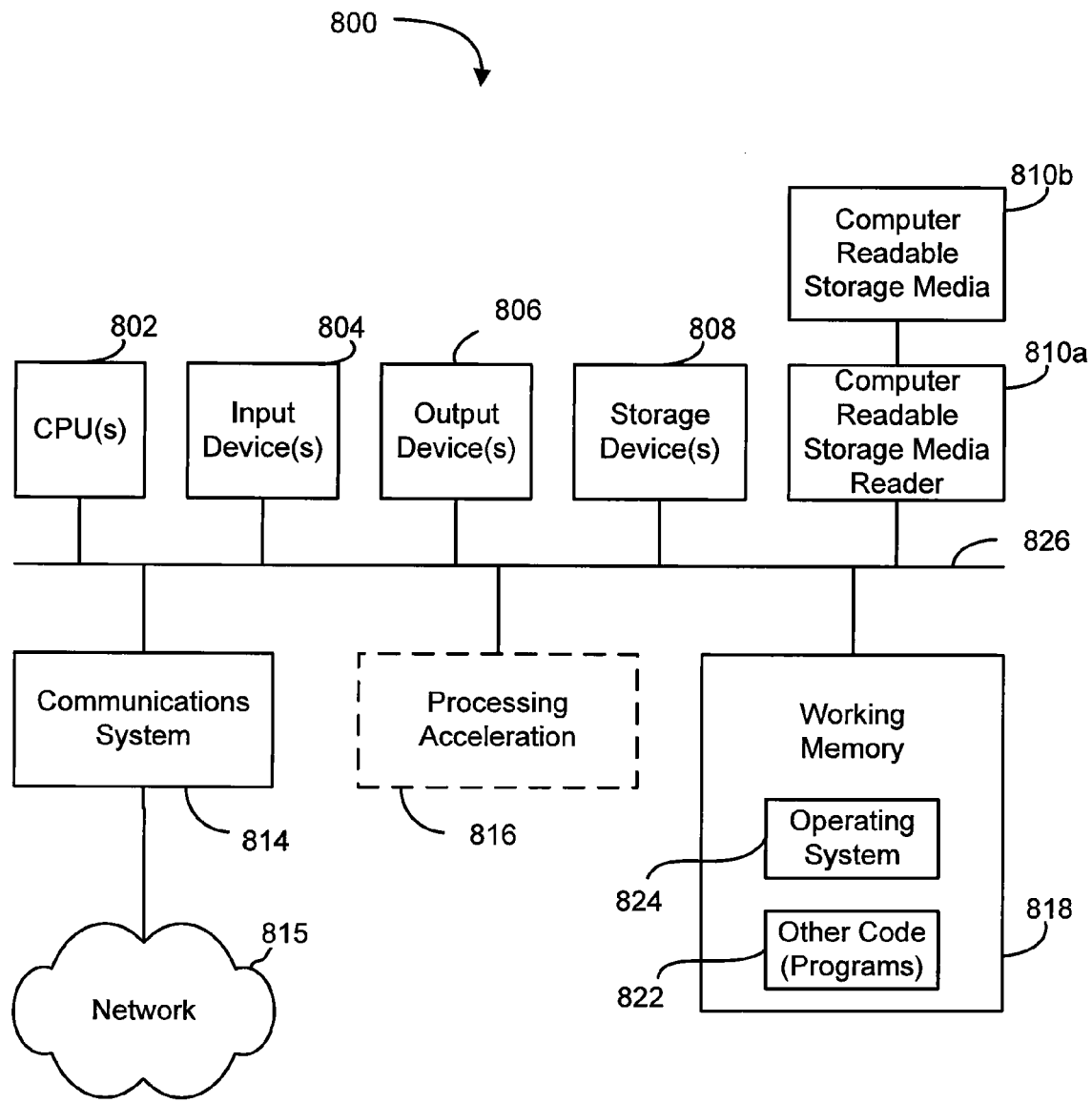
FIG. 8 is a block diagram of a computer system for implementing the functions and operations as described herein.

FIG. 8 provides a block diagram of a computer system 800 for implementing certain functions and operations as described herein. In one embodiment, the system 800 may function as the intermediate system 107 shown in FIG. 1 or other computing devices 108, 202, 218 illustrated in FIG. 1 and FIG. 2. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computational system 800 is shown comprising hardware elements that can be electrically coupled via a system bus 826 (or may otherwise be in communication, as appropriate). The hardware elements can include one or more central processor units (CPUs) 802, including without limitation one or more general-purpose processors and/or one or more special-purpose processors (such as communication processing chips, graphics acceleration chips, and/or the like); one or more input devices 804, that can include, without limitation, a mouse, a keyboard, and/or the like; and one or more output devices 806, which can include without limitation a display device, a printer, audio device, and/or the like.

The computational system 800 may further include (and/or be in communication with) one or more storage devices 808, which can comprise, without limitation, local and/or network accessible storage and/or can include, without limitation, a disk drive, a drive array, an optical storage device, solid-state storage device such as a random access memory ("RAM"), and/or a read-only memory ("ROM"), which can be programmable, flash-updateable, and/or the like. The computational system 800 might also include a communications subsystem 814, which can include without limitation a modem, a network card (wireless or wired), an infra-red communication device, a wireless communication device and/or chipset (such as a Bluetooth device, an 802.11 device, a WiFi device, a WiMax device, cellular communication facilities, etc.), and/or the like. The communications subsystem 814 may permit data to be exchanged with a network 815, and/or any other devices described herein. The network 815 may comprise a local area network (LAN) or a network such as the Internet, or a combination. In many embodiments, the computational system 800 will further include a working memory 818, which can include a RAM or ROM device, as described above. The system may optionally include processing acceleration 816 to assist with processing, such as arithmetic computations, graphical computations, and the like.

The computational system 800 also may comprise software elements, shown as being currently located within the working memory 818, including an operating system 824 and/or other code, such as one or more application programs 822, which may comprise computer programs performing tasks and operations described above, and/or may be designed to implement methods in accordance with the invention and/or configure systems in accordance with the invention, as described herein. Merely by way of example, one or more procedures described with respect to the method(s) discussed above might be implemented as code and/or instructions executable by a computer (and/or a processor within a computer). In one embodiment, the network processing and video data operations are implemented as application programs 822. In the description herein, references to "interface" and "processor" and "application" should be understood as referring to hardware, software, and combinations of the two, either as independent components (hardware, software, and/or both) for each interface, processor, or application, or as integrated components combined with one or more other components.

A set of these instructions and/or code may be stored on a computer readable storage medium 810*b*. In some embodiments, the computer readable storage medium 810*b* may comprise the storage device(s) 808 described above. In other embodiments, the computer readable storage medium 810*b* might be incorporated within the computer system 800. In still other embodiments, the computer readable storage medium 810*b* might be separate from the computer system (i.e., it may be a removable readable medium, such as a compact disc, etc.), and or might be provided in an installation package, such that the storage medium can be used to program a general purpose computer with the instructions/code stored thereon. These instructions might take the form of executable code, which is executable by the computational system 800 and/or might take the form of source and/or installable code, which, upon compilation and/or installation on the computational system 800 (e.g., using any of a variety of generally available compilers, installation programs, compression/decompression utilities, etc.), then takes the form of executable code. In these embodiments, the computer readable storage medium 810*b* may be read by a computer readable storage media reader 810*a*.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

In one embodiment, the invention employs local and remote computer systems (such as the computational system 800) to perform methods of the invention. According to a set of embodiments, some or all of the procedures of such methods are performed by the computational system 800 in response to the processor 802 executing one or more sequences of one or more instructions (which might be incorporated into the operating system 824 and/or other code, such as an application program 822) contained in the working memory 818. Such instructions may be read into the working memory 818 from another machine-readable medium, such as one or more of the storage device(s) 808 (or 810). Merely by way of example, execution of the sequences of instructions contained in the working memory 818 might cause the processor(s) 802 to perform one or more procedures of the methods described herein.

The terms "machine readable medium" and "computer readable medium," as used herein, refer to any medium that participates in providing data that causes a machine to operate in a specific fashion. In an embodiment implemented using the DPP 302, for example, various machine-readable media might be involved in providing instructions/code to processors for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as storage devices. Volatile media includes, without limitation, dynamic memory, such as the working memory. Transmission media includes coaxial cables, copper wire, and fiber optics, including the wires that comprise a system bus of the DPP 302, as well as various components of subsystems such as a communications subsystem or network delivery interface (and/or the media by which the communications subsystem provides communication with other devices).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, or any other medium from which a computer can read instructions and/or code.

Various forms of machine-readable media may be involved in carrying one or more sequences of one or more instructions to the computer processor for execution. Merely by way of example, the instructions may initially be carried on a magnetic disk and/or optical disc of a remote computer. A remote computer might load the instructions into its dynamic memory and send the instructions as signals over a transmission medium to be received and/or executed by the DPP 302. These signals, which might be in the form of electromagnetic signals, acoustic signals, optical signals, and/or the like, are all examples of carrier waves on which instructions can be encoded, in accordance with various embodiments of the invention.

The present invention has been described above in terms of presently preferred embodiments so that an understanding of the present invention can be conveyed. There are, however, many configurations of systems for managing the delivery of content-adapted or paced data not specifically described herein but with which the present invention is applicable. The present invention should therefore not be seen as limited to the particular embodiments described herein, but rather, it should be understood that the present invention has wide applicability with respect to video data delivery systems generally. All modifications, variations, or equivalent arrangements and implementations that are within the scope of the attached claims should therefore be considered within the scope of the invention.

We claim:

1. A method of streaming data over a network, the method comprising:

responsive to identifying a connection establishment message associated with establishment of a network connection to download a file to a receiving device, making a connection entry in a connection table of a source device for a first communication session with the receiving device;

receiving a first confirmation directed to the receiving device from the source device, the first confirmation indicating successful establishment of the first communication session between the receiving device and the source device;

forwarding the first confirmation to the receiving device;

receiving at least one first segment comprising first data from the source device, the first segment being directed to the receiving device as part of the first communication session;

creating at least one second segment of data by substituting second data for at least a portion of the first data, the second data being different than the first data;

sending the at least one second segment to the receiving device, the at least one second segment appearing to the receiving device as being from the source device and being part of the first communication session;

responsive to receiving the at least one first segment, sending at least one first acknowledgement message to the source device, the at least one first acknowledgement message appearing to the source device as being from the receiving device as part of the first communication session;

receiving at least one second acknowledgment message from the receiving device, the at least one second acknowledgement message being part of the first communication session; and transforming the at least one acknowledgement message and forwarding the transformed at least one acknowledgement message to the source device, the transformed at least one acknowledgement message appearing to the source device as being from the receiving device as part of the first communication session.

2. The method of claim 1, further comprising:

compressing the first data of the at least one first segment to form the second data.

3. The method of claim 1, further comprising:
maintaining a first series of sequence numbers associated with the at least one first segment received from the data path management device; and
maintaining a second series of sequence numbers associated with the at least one second segment sent to the receiving device.

4. A computer system comprising:
a network interface through which data is sent and received over a computer network;
a processor configured to communicate with the network interface and respond to a connection establishment message, associated with establishment of a network connection for downloading a file to a receiving device, by making a connection entry in a connection table of a source device for a first communication session with the receiving device, the processor further configured to respond to a received first confirmation directed to the receiving device from the source device, the first confirmation indicating successful establishment of the first communication session between the receiving device and the source device, by forwarding the first confirmation to the receiving device, receiving at least one first segment comprising first data from the source device, the first segment being directed to the receiving device as part of the first communication session, and creating at least one second segment of data by substituting second data for at least a portion of the first data, the second data being different than the first data, and then send the at least one second segment to the receiving device, the at least one second segment appearing to the receiving device as being from the source device and being part of the first communication session;
wherein the processor is further configured to respond to receiving the at least one first segment by sending at least one first acknowledgement message to the source device, the at least one first acknowledgement message appearing to the source device as being from the receiving device as part of the first communication session;
wherein the processor is further configured to respond to receiving at least one second acknowledgment message from the receiving device, the at least one second acknowledgement message being part of the first communication session, by transforming the at least one acknowledgement message and forwarding the transformed at least one acknowledgement message to the source device, the transformed at least one acknowledgement message appearing to the source device as being from the receiving device as part of the first communication session.

5. The computer system of claim 4, wherein the processor is further configured to compress the first data of the at least one first segment to form the second data.

6. The computer system of claim 4, wherein the processor is further configured to maintain a first series of sequence numbers associated with the at least one first segment received from the data path management device, and maintain a second series of sequence numbers associated with the at least one second segment sent to the receiving device.

* * * * *